United States Patent [19]

Ryles et al.

[11] Patent Number: 5,919,882
[45] Date of Patent: *Jul. 6, 1999

[54] HIGH PERFORMANCE ANIONIC POLYMERIC FLOCCULATING AGENTS

[75] Inventors: Roderick Glyn Ryles, Milford; Roger Edgar Neff; Joseph Jacinto Pellon, both of Stamford, all of Conn.

[73] Assignee: Cytec Technology Corp., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/753,837

[22] Filed: Dec. 2, 1996

Related U.S. Application Data

[63] Continuation of application No. 08/462,482, Jun. 5, 1995, abandoned, which is a continuation of application No. 07/864,243, Apr. 6, 1992, abandoned, which is a division of application No. 07/285,940, Dec. 19, 1988, abandoned.

[51] Int. Cl.[6] .................................................. C08F 220/04
[52] U.S. Cl. ........................... 526/306; 526/264; 526/287
[58] Field of Search .................................... 526/306, 264, 526/307.6, 287, 318.4, 307.1

[56] References Cited

U.S. PATENT DOCUMENTS

| | | |
|---|---|---|
| 3,235,490 | 2/1966 | Goren . |
| 4,172,066 | 10/1979 | Zweigle et al. . |
| 4,287,172 | 9/1981 | Jacquet et al. . |
| 4,459,396 | 7/1984 | Yamasaki et al. . |
| 4,525,527 | 6/1985 | Takeda et al. . |
| 4,687,807 | 8/1987 | Wetegrove et al. . |
| 4,720,346 | 1/1988 | Flesher . |
| 4,943,378 | 7/1990 | Flesher et al. . |

FOREIGN PATENT DOCUMENTS

| | | |
|---|---|---|
| 2589145 | 10/1985 | France . |
| 62-238780 | 3/1989 | Japan . |
| 8510496 | 4/1985 | United Kingdom . |

*Primary Examiner*—Christopher Henderson
*Attorney, Agent, or Firm*—Frank M. Van Riet; Joseph J. Mallon

[57] ABSTRACT

Unsheared, water-soluble, branched, high molecular weight, anionic, polymeric flocculants are produced by polymerizing ethylenically unsaturated anionic, and optionally nonionic, monomers and a branching agent in the presence of a chain-transfer agent. They are useful as flocculating agents for releasing water from dispersions of suspended solids.

7 Claims, No Drawings

HIGH PERFORMANCE ANIONIC POLYMERIC FLOCCULATING AGENTS

CROSS REFERENCE TO RELATED APPLICATIONS

This is a continuation of application(s) Ser. No. 08/462,482, filed on Jun. 5, 1995 now abandoned which, in turn, is a continuation of application Ser. No. 07/864,243 filed on Apr. 6, 1992, now abandoned which, in turn, is a divisional of application Ser. No. 07/285,940, filed on Dec. 19, 1998, now abandoned.

The present invention relates to high molecular weight, highly branched, water-soluble, anionic polymers and more particularly to a method of preparing such polymer compositions, and their use as flocculating agent.

BACKGROUND OF THE INVENTION

Flocculation is a form of liquid-solid phase separation which facilitates the removal of finely divided particles from a liquid by enhancing agglomeration of suspended particles in order to increase particle size, and is often applied to enable conformity with effluent clarity requirements. Flocculation may be accomplished by chemical means, e.g., addition of a flocculating agent.

Synthetic organic, polymeric, flocculating agents have been utilized in industry since the 1950's. It has been observed, by those skilled in the art, that high molecular weight polymers are particularly useful as chemical flocculating agents, provided that the polymers are water-soluble. Many such water-soluble, high molecular weight, polymeric, flocculating agents are known to those skilled in this art.

Water-soluble polymers have been used as flocculating agents in the treatment of waste sludges, with some degree of success. However, due to modern concerns with environmental protection, it has become increasingly desirable to improve on the performance of conventional flocculants by providing a flocculating agent which increases the rate of settling of suspended solids.

The present invention provides a method for preparing a novel, highly branched, high molecular weight, water-soluble, polymeric flocculant using a polyfunctional monomer such as methylenebisacrylamide, polyethyleneglycol dimethacrylate, n-vinyl acrylamide and the like, as a branching agent. The prior art discloses several attempts to produce high molecular weight, branched, water-soluble polymers. Zweigle, U.S. Pat. No. 4,059,522 discloses the use of branching agents to yield a totally crosslinked system, but flocculants prepared in this manner are insoluble in water and thus ineffective. Morgan, et al., U.S. Pat. No. 3,698,037 discloses branched, cationic homopolymers obtained through incorporation of a multifunctional branching agent in the absence of a molecular weight controlling or chain-transfer agent. It is well known to those skilled in the art, that the molecular weight of such cationic homopolymers is limited, whereas much higher molecular weight polymers may be obtained by copolymerizing cationic monomers with acrylamides. The above discussed patent makes no mention of molecular weight specifics.

Pech, Fr. 2,589,145 discloses a branched copolymer prepared using solution polymerization techniques in the presence of a high activity chain transfer agent. However, the polymers disclosed in this patent have molecular weights below 1 million with solution viscosities of 2200 to 3600 mPa.s at 20 percent polymer concentrations, thus showing these polymers to be truly low molecular weight copolymers. The lowest molecular weight polymer of the present invention is much higher, greater than 1 million, as evidenced by its solution viscosity, (see said above-mentioned copending application.)

Other patent disclosures use shearing of crosslinked polymer chains to obtain desired water solubility. Whittaker, U.S. Pat. No. 4,705,640 discloses the shearing of crosslinked polymer gels which are insoluble in water to physically degrade them to such an extent that they become water-soluble. The preferred method of degradation is mechanical with a high degree of chopping type action, such as subjecting dilute solutions of polymer to rotating blades at up to 20,000 rpm. Degradation is claimed to improve flocculation performance by increasing the effective ionicity of the polymer. The increase in effective ionicity is quantified by measuring the ionic regain (IR); $IR=(IAD-IBD)/IAD \times 100$ where IAD is the ionicity after degradation and IBD is the ionicity before degradation. The ionicity can be measured by a colloid titration 25 technique as described therein and also Flesher et al, U.S. Pat. No. 4,720,346, which discloses a process for flocculating aqueous suspensions of solids by the use of a polymeric material in the form of small particles rather than a true solution. Flesher et al also 30 disclose the need to shear crosslinked polymer materials, such that the polymer has an ionic regain value of 15 to 70 percent, since polymers having too low an IR value give an inadequate benefit. Flesher et al define shear as that which is applied as an analytical technique to impart properties on polymers, such as IR, so that the polymers may be used in that invention. In Column 11, lines 3–10, Flesher et al further disclose that higher flocculant dose levels are needed to achieve optimum floc stability, sometimes 20 percent more than dose requirements of conventional, water-soluble, polymers. Flesher indicates that branched copolymers can be prepared by using chain transfer agents such as isopropanol and mercaptoethanol in conjunction with cross-liking agents. However, no examples are provided and it appears quite unlikely that Flesher and coworkers discovered compositions corresponding to those claimed herein, which out perform the Flesher and Farrar materials and are simpler to use.

Farrar, in U.S. Pat. No. 4,759,856, also describes, in Column 6, lines 1–6, the need to apply shear to convert crosslinked polymers that would normally have been rejected or that would have been expected to have given poor flocculation properties to a form in which it will give very good flocculation properties. The patentee teaches shearing in such a manner that the polymer undergoes an ionic regain of at least 15 percent, preferably at least 30 percent, and usually at least 50 percent, as a result of the shearing, to effect a conversion to a useful polymer flocculant.

Surprisingly, it has now been discovered that high molecular weight, highly branched, water-soluble, anionic, polymeric flocculants can be produced without the use of high level shear. Polymeric flocculants produced by the practice of the present invention are subjected only to minimal levels of shear, sufficient only to cause solubilization with little or no physical degradation of the polymer. Polymeric flocculants of the present invention outperform the flocculants of the prior art, consistently producing higher settling rates. Additionally, polymeric flocculants of this invention are more convenient and less costly to use than prior art flocculants which require the end user to employ high shear equipment prior to use, in order to gain the desired optimum flocculation effect, thus increasing both the time and cost of the operation.

The present invention enables the preparation of truly water-soluble, highly branched, high molecular weight, anionic polymers particularly useful as chemical flocculating agents. The polymers of this invention are prepared using a branching agent in the presence of a chain-transfer agent to produce a product which is highly branched and water-soluble. The polymers of this invention do not require the application of controlled shear to attain optimum performance, thereby saving additional costs. The present invention has particularly been found useful when applied to branched copolymers comprising acrylamide and at least one ethylenically unsaturated anionic monomer.

SUMMARY OF THE INVENTION

According to the present invention, there are provided unsheared, anionic, water-soluble, branched, polymeric flocculants, said polymeric flocculants having a solution viscosity of at least 3.0 mpa.s measured in a Brookfield viscometer with a UL adapter at 25° C. on a 0.1 percent by weight polymer solution in 1M NaCl at 60 rpm, and a branching agent content of from about 4 to about 80 molar parts per million based on initial monomer content. Preferably, the branching agent comprises from about 8 to about 20 molar parts per million based on original monomer content. For purposes of this invention, the term "unsheared", when used herein and in the appended claims, does not exclude normal mixing which is used to disperse polymers. For example, mixing with a magnetic stirrer, as will be described hereinafter, will not produce a "sheared" polymer but the polymer will be "unsheared" within the meaning of the claims even after 2 hours of mixing.

Also, according to the present invention there is provided a process for the preparation of an unsheared, water-soluble, branched, anionic, polymeric flocculant, as above defined, said process comprising polymerizing one or more anionic, ethylenically unsaturated monomers with at least one branching agent in an amount from about 4 to about 80 molar parts per million based on initial monomer content, in the presence of at least one chain-transfer agent.

Furthermore, according to the present invention, there is provided a method of releasing water from a dispersion of suspended solids, such as mineral waste, which comprises (a) adding to the suspension from about 0.1 to about 50,000 parts per million of suspension solids of an unsheared water-soluble, branched, anionic, polymeric flocculant, as defined above, and (b) dewatering the dispersion of suspended solids and polymeric flocculant.

DETAILED DESCRIPTION OF THE INVENTION

High molecular weight, unsheared highly branched, water-soluble, anionic polymeric flocculants are formed by the polymerization of anionic, and optionally nonionic, ethylenically unsaturated monomers with branching agent comonomers in the presence of a chain-transfer agent in optimum proportions.

Anionic monomers of the present invention are selected from anionic ethylenically unsaturated compounds. Generally they comprise (meth)acrylic acids; sulfoalkyl(meth) acrylic acids; sulfonated styrenes; unsaturated dicarboxylic acids; sulfoalkyl(meth)acrylamides, salts of said acids and the like.

Nonionic monomers, suitable in the practice of this invention, generally comprise one or more nonionic monomers selected from acrylamide; N-alkyl acrylamides; N,N-dialkyacrylamides; methacrylamides; vinyl acetate; alkyl (meth)acrylates; acrylonitrile; N-vinylmethylacetamide and N-vinyl pyrrolidone.

Anionic, ethylenically unsaturated monomers may be copolymerized with different anionic or nonionic ethylenically unsaturated monomers to produce anionic copolymers. Preferably, an acrylamide is copolymerized with an anionic comonomer to produce an anionic copolymer. Anionic polymers, useful in the practice of this invention, comprise from about 0 to about 99 parts, by weight, of non-ionic monomer and from about 100 to about 1 part, by weight, of anionic monomer. Preferably, the anionic copolymer comprises from about 10 to about 99 parts, by weight, of non-ionic monomer and from about 90 to about 1.0 part, by weight, of anionic monomer.

Polymerization of the anionic monomer is conducted in the presence of a polyfunctional branching agent to form the branched homopolymer or copolymer. The polyfunctional branching agent comprises compounds having either at least two double bonds, a double bond and a reactive group or two reactive groups. Polyfunctional branching agents should have at least some water-solubility. Illustrative of those compounds containing at least two double bonds are methylenebisacrylamide; methylenebismethacrylamide; polyethyleneglycol diacrylate; polyethyleneglycol dimethacrylate; N-vinyl acrylamide; divinylbenzene; triallylammonium salts; N-methylallylacrylamide, and the like. Polyfunctional branching agents containing at least one double bond and at least one reactive group include glycidyl acrylate; acrolein; methylolacrylamide, and the like. Polyfunctional branching agents containing at least two reactive groups include aldehydes, such as glyoxal; diepoxy compounds; epichlorohydrin and the like.

Branching agents should be used in sufficient quantities to assure a highly branched polymeric product. Preferably, a branching agent content of from about 4 to about 80 molar parts per million, based on initial monomer content, is added to induce sufficient branching of the polymer chain.

Essential to the practice of this invention is the addition of, in optimum concentration, a molecular weight modifying or chain-transfer agent to control the structure and solubility of the polymer. In the absence of a chain-transfer agent, the incorporation of even extremely small amounts of branching agent, e.g. 5 parts per million, may cause crosslinking, rendering the polymer insoluble in water. However, soluble, highly branched, polymeric products are obtained in accordance with the present invention when a chain-transfer agent is used, in optimum concentration in conjunction with said branching agent. Many such chain-transfer agents are well known to those skilled in the art. These include alcohols; mercaptans; thioacids; phosphites and sulfites, such as isopropyl alcohol and sodium hypophosphite, although many different chain-transfer agents may be employed.

It is extremely important that optimum concentrations of chain-transfer agent be employed in order to produce a highly branched, water-soluble product. Addition of too little chain-transfer agent produces a non-soluble, polymer product and the addition of too much chain-transfer agent produces a product with too low a solution viscosity, i.e. molecular weight.

Actual polymerization may be carried out using gel or emulsion (suspension) polymerization techniques. These techniques are widely known to those skilled in the art.

Emulsion polymerization procedures involve the preparation of two phases. The aqueous phase comprises the monomer(s), branching agent and chain-transfer agent dissolved in deionized water, and other additives well known to those skilled in this art, such as stabilizers and pH adjusters. The oil phase comprises a water-insoluble hydrocarbon solution of surfactant(s). The aqueous phase and oil phase are then mixed and homogenized in a conventional apparatus, until particle size is in the 1.0 micron range and a suitable bulk viscosity is obtained. The emulsion is then transferred to a suitable flask wherein the emulsion is agitated and sparged with nitrogen for about thirty minutes. A polymerization initiator, such as sodium metabisulfite solution, is then continuously added to the solution to begin polymerization. Polymerization is allowed to exotherm to the desired temperature which is maintained by cooling until cooling is no longer required. Finished emulsion product is cooled to 25° C.

In a typical gel polymerization procedure, monomer(s), branching agent and chain-transfer agent are dissolved in deionized water and the pH is adjusted. The solution is placed in a polymerization vessel and sparged with nitrogen, with the temperature of the solution being adjusted to about 6.0° C. An initiator is then added, and the polymerization is allowed to exotherm to maximum temperature. Once maximum temperature is attained, the media is placed in an oven at about 70° C. for about 8 hours. The resulting gel is reduced to gel worms, air dried and reduced to powder.

Any conventional additives may be used to stabilize the aqueous phase and oil phase solution. Suitable additives include ammonium sulfate; ethylenediaminetetraacetic acid (disodium salt) and diethylene triaminepentaacetate (pentasodium salt). See Modern Plastics Encyclopedia/88, McGraw Hill, October 1987, pp. 147–8.

Any known initiator may be employed to initiate polymerization. Suitable for use in this invention are azobisisobutyronitrile; sodium sulfite; sodium metabisulfite; 2,2-azobis(2-methyl-2-amidinopropane) dihydro-chloride; ammonium persulfate; ferrous ammonium sulfate hexahydrate and the like. Organic peroxides may also be employed for polymerizing ethylenically unsaturated monomers. Particularly useful for the purposes of this invention is t-butyl hydroperoxide. See Modern Plastics Encyclopedia/88, McGraw Hill, October 1987, pp. 165–8.

The product so prepared is an unsheared, high molecular weight, highly branched, water-soluble, anionic polymer specially suited for use as a chemical 30 flocculating agent without requiring the use of controlled shear to attain optimum performance.

The flocculation and dewatering stages of this invention, to release water from a dispersion of suspended solids, are carried out by adding the unsheared, highly branched, high molecular weight, water-soluble, anionic, polymeric flocculant in solution to the suspension and then using a conventional dewatering apparatus to remove water from the suspension, producing a crystal clear effluent.

The product of this invention is useful in facilitating a wide range of solid-liquid separation operations. The anionic polymeric flocculant may be used to dewater suspended solids and industrial sludges, for the drainage of cellulosic suspensions such as those found in paper production and for the settlement of various inorganic suspensions.

DESCRIPTION OF THE PREFERRED EMBODIMENTS

The following examples illustrate the present invention. They are not to be construed to limit the claims in any manner whatsoever.

EXAMPLES 1 TO 3

An anionic, ammonium acrylate/acrylamide copolymer is prepared by emulsion polymerization. The aqueous phase is made by dissolving 291.1 gms of commerical (50%) acrylamide monomer, 64.0 gms of acrylic acid, 2.1 gms of isopropyl alcohol, as chain transfer agent, 1.5 gms of 0.209% methylenebisacrylamide, as branching agent, 0.6 gm of the disodium salt of ethylenediamine tetracetic acid, as chelating agent, and 1.3 gms of 20% t-butyl hydroperoxide as a polymerization initiator, into 107.0 gms of deionized water. The pH is adjusted to 6.5 by adding 4.49 gms of 29% ammonium hydroxide.

The oil phase is prepared by dissolving 17.5 gms of sorbitan monooleate into 178.5 gms of low odor paraffin oil.

The aqueous phase and oil phase are mixed together and homogenized until the particle size is in the 1.0 micron range.

The emulsion is then transferred to a one liter, three-necked, creased flask equipped with an agitator, nitrogen sparge tube, sodium metabisulfite activator feed line and thermometer.

The emulsion is then agitated, sparged with nitrogen and the temperature adjusted to 25° C. (±1° c.). After sparging for 30 minutes, 0.8% sodium metabisulfite (MBS) solution is added at a rate of 0.028 ml/min. The polymerization is allowed to exotherm and 10 the temperature is controlled with ice water. When cooling is no longer necessary to maintain the required temperature, the 0.8% MBS solution addition rate is increased and a heating mantel applied to maintain the temperature. The total polymerization time takes approximately 4 to 5 hours. The finished emulsion product is then cooled to 25° C. The experiment is repeated varying the amounts of isopropyl alcohol (IPA) and methylenebisacrylamide (MBA) in proportion to base monomer. The solution viscosity is determined and set forth in the Table 1, below. Solution viscosity is determined by preparing an aqueous emulsion solution. A 0.2% aqueous solution of the emulsion product is prepared by dispersing 1.70 grams of 34% emulsion product into a one liter beaker containing 298 grams of deionized water and 0.2 gram of breaker surfactant. The dispersion is agitated at 250 rpm for 2 hours on a magnetic stirrer with a 6 cm long by 1 cm diameter magnetic stirring bar. The solution is then diluted to 0.1% with water.

A 0.1% sheared solution is also prepared for comparison purposes. Unsheared 0.1% solution, prepared from the 0.2% solution, as defined above, is transferred into a 30 oz. Waring blender glass jar having an inside diameter of about 7 cm and four rotable blades that are about 4 cm in diameter, 2 blades pointing upward at about 30° angles and two blades pointing downward at 30° angles. The blades are 1 mm thick and are rotated at about 12,100 rpm for two hours. The solution temperature is kept at or below 25° C. during this two hour shearing period.

Solution viscosity is determined by adding 5.84 gms of sodium chloride to 100 grams of 0.1% sheared or unsheared polymer solution and stirring slowly for 15 minutes. The viscosity is then determined by using a Model LVT Brookfield viscometer with UL adapter at 60 rpm, at 25° C. (±0.1° C.).

The anionic copolymers are then tested for clay settling according to the following procedure. 20 gms of kaolinite clay are soaked in 800 gms of deionized water in a one liter graduated cylinder for two hours. A 0.2% real polymer solution of the sodium acrylate/acrylamide copolymer is prepared, as described earlier. 1.0 gm of the 0.2% aqueous polymer solution is dispersed in 300 gms deionized water which is then mixed with 800 gms of clay suspension with a perforated plunger with four up and down plunges in four seconds. The time taken for the flocculated clay interface to settle from the 1000 ml mark of the graduated cylinders to the 6000 ml mark (14.1 cm) is recorded. The settling rate (cm/sec) is calculated by dividing the distance settled (14.1 cm) by the recorded time. The results, along with compositional data, are set forth in Table 1, below.

TABLE 1

AMMONIUM ACRYLATE/ACRYLAMIDE
COPOLYMERS-FLOCCULATION OF CLAY

| Example | MBA wppm | MBA mppm | IPA % | S.V. mPa s | S.V. (S) mPa · s | Settling Rate, cm/s Unsheared | Sheared |
|---|---|---|---|---|---|---|---|
| 1A | 15 | 6.9 | 0 | 2.39 | 2.92 | 0.147 | 0.290 |
| 1B | 15 | 6.9 | 1.0 | 3.09 | — | 0.979 | — |
| 1C | 15 | 6.9 | 1.5 | 4.21 | — | 1.240 | — |
| 2A* | 25 | 11.6 | 0 | 1.95 | 2.11 | 0.130 | 0.160 |
| 2B* | 25 | 11.6 | 1.0 | 2.14 | — | 0.367 | — |
| 2A | 25 | 11.6 | 1.5 | 3.55 | — | 0.691 | — |
| 3A* | 50 | 23.2 | 0 | 1.64 | 1.51 | 0.112 | 0.111 |
| 3B* | 50 | 23.2 | 1.0 | 1.53 | — | 0.152 | — |
| 3C* | 50 | 23.2 | 1.5 | 1.91 | — | 0.224 | — |

MBA = methylenebisacrylamide.
wppm = weight parts per million
IPA = isopropanol
S.V. (S) = solution viscosity sheared
* = Control Sample
mppm = Molar parts per million Table 1, above, demonstrates that soluble, anionic, highly branched, copolymeric flocculants can be prepared without the cumbersome and expensive application of high shear equipment. Furthermore, it can be clearly seen that the unsheared, anionic, highly branched, copolymeric, flocculants of the present invention significantly outperform sheared anionic polymers of the prior art, effecting a faster settling of suspended solids at lower dose levels.

EXAMPLES 4–12

The procedure of Example 1 is repeated substituting various anionic monomers for ammonium acrylate. 4) Acrylic acid; 5) methacrylic acid; 6) sodium sulfoethyl methacrylate; 7) sodium methacrylate; 8) itaconic acid; 9) sodium itaconate; 10) the sodium salt of 2-acrylamido-2-methylpropane sulfonate; 11) the sodium salt of sulfopropylacrylate and 12) a mixture of sodium acrylate and acrylic acid are employed as anionic monomers. Unsheared, water-soluble, branched, anionic polymeric flocculants are formed similar to those of Example 1.

EXAMPLES 13–18

The procedure of Example 1 is repeated substituting various nonionic monomers for acrylamide. 13) Methacrylamide; 14) N-vinyl methylacetamide; 15) N-vinyl methylformamide; 16) vinyl acetate; 17) N-vinyl pyrrolidone and 18) a mixture of acrylamide and methacrylamide are employed as nonionic monomers. Unsheared water-soluble, branched, anionic, polymeric flocculants similar to those of Example 1 are formed.

EXAMPLES 19–21

The procedure of Example 1 is repeated using no nonionic monomer. 19) Sodium acrylate; 20) acrylic acid and 21) a mixture of sodium acrylate and acrylic acid are employed as anionic monomers. Unsheared, water-soluble, branched, anionic, homopolymeric flocculants of excellent stability, are formed.

EXAMPLES 22–28

The procedure of Example 1 is repeated varying the branching agent. 22) Methylenebismethacrylamide; 23) polyethyleneglycol diacrylate; 24) polyethyleneglycol dimethacrylate; 25) N-vinyl acrylamide; 26) glycidyl acrylate; 27) glyoxal and 28) acrolein are employed instead of methylenebisacrylamide. Unsheared, water-soluble, branched, anionic, polymeric flocculants are formed similar to that of Example 1.

EXAMPLE 29

The procedure of Example 1 is repeated employing sodium hypophosphite as the chain-transfer agent instead of isopropyl alcohol. An unsheared, water-soluble, branched, anionic, polymeric flocculant is recovered.

The above mentioned patents, patent applications and publications are incorporated herein by reference.

Many variations of the present invention will suggest themselves to those skilled in this art in light of the above detailed description. For example, instead of using methylenebisacrylamide as a branching agent, any polyfunctional monomer compound may be used including dialdehydes, epichlorohydrin, methylolacrylamide, n-methylallylacrylamides, divinyl benzene, triallylammonium salts and diepoxy compounds. Similarly, a number of known chain-transfer agents may be employed instead of isopropyl alcohol, such as other alkanols, phosphites, mercaptans, sulfites and thioacids.

Monomers may include any anionic or nonionic ethylenically unsaturated acrylic or vinyl monomers.

Also contemplated are all techniques, known to those skilled in this art, of polymerization and of flocculation, drainage, thickening or settling of dispersions of suspended solids.

All such obvious modifications are within the full intended scope of the appended claims.

We claim:

1. An unsheared, water-soluble, branched, anionic, polymeric flocculant having a solution viscosity of at least about 3.0 mPa.s measured in a Brookfield viscometer with a UL adapter at 25° C. on a 0.1 percent, by weight, polymer solution in 1M NaCl at 60 rpm, and a branching agent content of from about 4 to about 80 molar parts per million based on initial monomer content, said flocculant being efficient when added as a true solution to dispersions of suspended solids for the purpose of releasing water therefrom.

2. A polymeric flocculant as defined in claim 1 wherein said polymeric flocculant is a polymer formed from one or more ethylenically unsaturated monomers selected from (meth)acrylic acid; sulfoalkyl(meth)acrylic acids; sulfonated styrenes; unsaturated dicarboxylic acids; sulfoalkyl (meth)acrylamides; salts of said acids and the like.

3. A polymeric flocculant as defined in claim 2 containing, in addition, one or more nononic monomers selected from acrylamide; N-alkylacrylamides; N,N-di-alkylacrylamides; methacrylamides; vinyl acetate; alkyl (meth)acrylates; acrylonitrile; N-vinyl methylacetamide and N-vinyl pyrrolidone.

4. A polymeric flocculant as defined in claim 2 wherein said polymeric flocculant is a polymer formed from a monomer selected from acrylic acid or its alkali or ammonium salts.

5. A polymeric flocculant as defined in claim 3 wherein said polymer is formed from acrylamide in combination with at least one anionic monomer.

6. A polymeric flocculant as defined in claim 3 wherein said polymer is formed from acrylamide and ammonium acrylate.

7. A polymeric flocculant as defined in claim 1 having a branching agent content of from about 8 to about 20 molar parts per million based on original monomer content.

* * * * *